(12) United States Patent
Ohkawa et al.

(10) Patent No.: US 6,345,899 B1
(45) Date of Patent: Feb. 12, 2002

(54) SURFACE LIGHT SOURCE DEVICE OF SIDE LIGHT TYPE

(75) Inventors: Shingo Ohkawa, Koshigaya; Takayuki Arai, Kasukabe, both of (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 09/033,650

(22) Filed: Mar. 3, 1998

(30) Foreign Application Priority Data

Mar. 7, 1997 (JP) .............................................. 9-070736
Aug. 4, 1997 (JP) .............................................. 9-221885

(51) Int. Cl.$^7$ .............................................. F21V 13/02
(52) U.S. Cl. .............................. 362/31; 362/331; 349/61
(58) Field of Search .............................. 362/26, 31, 27, 362/331, 293; 349/61, 65, 70

(56) References Cited

U.S. PATENT DOCUMENTS

| | | | | | |
|---|---|---|---|---|---|
| 4,001,628 A | * | 1/1977 | Ryan | ........................... | 313/111 |
| 4,022,709 A | * | 5/1977 | Ferro | ....................... | 106/31.15 |
| 4,099,090 A | * | 7/1978 | Corth | ........................... | 313/113 |
| 4,729,068 A | * | 3/1988 | Ohe | ........................... | 362/277 |
| 5,408,387 A | * | 4/1995 | Murase | ........................... | 362/31 |
| 5,408,388 A | * | 4/1995 | Kobayashi | ................... | 362/31 |
| 5,649,754 A | * | 7/1997 | Matsumoto | .................. | 362/27 |
| 5,714,218 A | * | 2/1998 | Nishio | ........................ | 428/64.4 |
| 5,816,677 A | * | 10/1998 | Kurematsu | .................... | 362/26 |
| 5,886,759 A | * | 3/1999 | Mashino | ....................... | 349/65 |

* cited by examiner

*Primary Examiner*—Alan S. Cariaso
*Assistant Examiner*—Hargobind Sawhney
(74) *Attorney, Agent, or Firm*—Staas & Halsey LLP

(57) ABSTRACT

In a surface light source device of side light type comprising a light guide plate having two major surfaces providing an emission surface and a back surface and a primary light source for supplying irradiation light containing short-wavelength component (blue component) and long-wavelength component (complementary color component to blue) of visible ray region through an end face of the light guide plate, uniformity in color of irradiation light is improved. This surface light source device of side light type further comprises a color correcting film for suppressing change in color of the irradiation light depending on distance from the end face, disposed in the vicinity of at least one of the two major surfaces. The color correcting film may be ink printed on the light guide plate. In a case in which a sheet-like member is disposed along the emission surface of the light guide plate, the color correcting film may be ink printed on the sheet-like member. The color correcting film may be formed on a sheet-like member disposed along the back surface of the light guide plate. The color correcting film has different response characteristics to short-wavelength component and long-wavelength component contained in the irradiation light.

9 Claims, 11 Drawing Sheets

20:
SURFACE LIGHT SOURCE DEVICE
OF SIDE LIGHT TYPE

30: SURFACE LIGHT SOURCE DEVICE OF SIDE LIGHT TYPE

SURFACE LIGHT SOURCE DEVICE OF SIDE LIGHT TYPE

BACKGROUND

1. Field of the Invention

This invention relates to a surface light source device of side light type and more particularly to a surface light source device of side light type wherein uniformity in color characteristic of irradiation light is improved. This invention is applicable particularly to back lighting of a liquid crystal display.

2. Description of the Related Art

The surface light source device of side light type has been employed in, for example, a liquid crystal display apparatus. This device irradiates the liquid crystal display panel from its back surface. This disposition is suitable for thinning the entire shape of the apparatus.

In the surface light source device of side light type, ordinarily, a rod-like light source such as cold cathode tube is employed as a primary light source and disposed on a side of the light guide plate. Irradiation light emitted from the primary light source passes a side end face of the light guide plate so that it is introduced into the inside of the light guide plate. The introduced irradiation light is transmitted inside of the light guide plate. In that process, light emission occurs from a major surface of the light guide plate toward a liquid crystal display panel.

As the light guide plate employed in such a surface light source device of side light type, a type having substantially equal plate thickness and another type in which the plate thickness decreases as it goes far from the primary light source have been well known. Generally, the latter emits irradiation light more effectively than the former.

FIG. 12 is a disassembly perspective view showing the surface light source device of side light type using the light guide plate of the latter. FIG. 13 shows a section along the line A—A of FIG. 12. Referring to FIGS. 12, 13, the surface light source device of side light type 1 comprise a light guide plate 2, a primary light source 3, a reflection sheet 4, a light scattering sheet 5, and prism sheets 6, 7 acting as a light control member. The reflection sheet 4, light guide plate 2, light scattering sheet 5 and prism sheets 6, 7 are laminatedly arranged and fixed by a frame member (not shown).

The light guide plate 2 has two major surfaces. One major surface provides an emission surface 2C and another major surface provides a back surface 2B. An end surface of the light guide plate 2 provides an incidence surface 2A. The primary light source 3 is composed of a fluorescent lamp 8 with a reflector 9 on the back. As well known, the emission light of the fluorescent lamp 8 contains both short-wavelength component (blue component) and long-wavelength component (complementary color component to blue) of visible ray region.

To intensify brightness level and uniformity of the surface light source device, the back surface 2B of the light guide plate 2 provides' a light scattering surface 2D. The light scattering surface 2D contains a distribution pattern composed of, for example, a great number of light scattering dot-like elements. This distribution pattern is called dot pattern.

FIG. 14 is a view for explaining a basic type of the distribution pattern on the light scattering surface 2D, which depicts the light guide plate 2 viewed from the back surface 2B. In FIG. 14, the light scattering elements are expressed by a great number of large and small squares. The light scattering elements are formed in the form of light scattering ink layer, fine uneven surface or the like. The light scattering ink contains pigment of, for example, magnesium carbonate, titanium oxide or the like. The light scattering property of the light scattering surface 2D tends to increase corresponding to distance from the incidence surface 2A along the lamp 8 to obtain an equal brightness level. This tendency is realized by design of the distribution of size, density or other factors of the light scattering element.

The primary light source 3 is provided with a reflector 9 having a semi-circular section, disposed on the back of a cold cathode tube (fluorescent lamp) 8. The irradiation light is supplied to an end face of the light guide plate 2 through an opening of the reflector 9. For the reflection sheet 4, a sheet-like regular reflection member composed of metallic foil or the like or a sheet-like irregular reflection member composed of white PET film or the like is employed. The reflection sheet 4 brings back light leaking from the back surface 2B to the light guide plate 2 so as to reduce loss of light.

The irradiation light L from the primary light source 3 is introduced into the light guide plate 2 through the incidence surface 2A. The irradiation light L is transmitted toward an end (wedge distal end) while being repeatedly reflected between the back surface 2B along which the reflection sheet 4 is laid and the emission surface 2C. In this while, the irradiation light L is subjected to light scattering action by the light scattering surface 2D formed on the back surface 2B. If the reflection sheet 4 composed of the irregular reflection member is employed, the irradiation light is also subjected to the irregular reflection action.

Each time when the irradiation light L is reflected by the slope 2B, the incidence angle relative to the emission surface 2C gradually decreases. The decrease of the incidence angle increases component having a smaller angle than the optimum angle relative to the emission surface 2C thereby inducing emission from the emission surface 2C. Because this operation is intensified as it goes far toward the end of the light guide plate 2, a shortage of the emission light in a region far from the incidence surface 2A is compensated.

The irradiation light emitted from the emission surface 2C passes the light scattering sheet 5 and is directed toward the prism sheets 6, 7. The light scattering sheet 5 scatters the irradiation light emitted from the light guide plate 2, thereby preventing the light scattering surface of the back surface 2B from being visually noticed from above the emission surface 2C. The light scattering sheet 5 further suppresses local excessive brightness, shade and the like in the light guide plate 2. Depending on the case, the light scattering sheet 5 is not employed.

The prism sheets 6, 7 are formed of transparent sheet-like material of polycarbonate or the like. The prism surface is formed on an opposite side to a surface (outside surface) opposing the light guide plate 2. The prism surface has a great number of projections which extend substantially parallel in a single direction and have a triangle section. In the inside prism sheet 6, its projections are oriented so as to run parallel to the incidence surface 2A. The outside prism sheet 7 is oriented so that the projections extend substantially perpendicular to the incidence surface 2A.

The slopes of these projections correct main emission direction of the emission light to the frontal direction of the emission surface 2C. A double-sided prism sheet having each prism surface on both sides may be used.

Generally, as compared with the surface light source device of side light type in which a substantially equal thickness light guide plate is employed, the surface light source device of side light type employing such a wedge-shaped light guide plate and a prism sheet is capable of emitting the emission light more effectively to the frontal direction.

However, the aforementioned conventional surface light source device of side light type 1 has a problem. That is, there is produced a phenomenon that the color of the emission light changes delicately depending on distance from the incidence surface 2A. This tendency is more remarkable as size of the light guide plate 2 increases.

According to an experiment, as described in FIG. 13, the irradiation light becomes bluish near the incidence surface 2A (blue light component tends to be excessive), and yellowish near the wedge distal end (end of the light guide plate) (blue light component tends to be short). In the middle, the bluish component decreases as it approaches the wedge distal end while the yellowish component increases. In other words, the short-wavelength component relatively decreases as it approaches the wedge distal end from the incidence surface 2A while the long-wavelength component relatively increases.

This phenomenon is estimated to be caused by wavelength dependency of response characteristic (wavelength dependency of reflection or absorption) to light, of elements composing the surface light source device 1. For example, the reflection sheet 4 made of white PET film has reflection factor which varies depending on wavelength, as follows:

wavelength 450 nm; reflection factor 97% wavelength 600 nm; reflection factor 95.5% wavelength 750 nm; reflection factor 94%

Because, the material of the light guide plate 2 has generally scattering property (wavelength dependency of refractivity), the optimum angle relative to the emission surface 2C and back surface 2B differs depending on the wavelength. As a result, escaping rate from the light guide plate 2 is provided with wavelength dependency.

It is estimated that as a result of combined actions of these factors, a distribution of the color of the emission light from the light guide plate 2 occurs.

Generally, such a color distribution is not favorable. Particularly, when applied to back lighting of the liquid crystal display, its display quality is remarkably deteriorated.

OBJECT AND SUMMARY OF THE INVENTION

To solve the above problem, it is therefore an object of the present invention to provide a surface light source device of side light type wherein change in color along distance from near an incidence surface of a light guide plate to an end thereof is suppressed.

The present invention is applied to a surface light source device of side light type comprising a light guide plate having two major surfaces providing an emission surface and a back surface and a primary light source for supplying irradiation light containing short-wavelength component (blue component) and long-wavelength component (complementary color component to blue) of visible ray region through an end face of said light guide plate.

According to the present invention, there is provided a surface light source device of side light type having the above feature, further comprising a color correcting film for suppressing change in color of the irradiation light depending on distance from the end face, disposed in the vicinity of at least one of two major surfaces of the light guide plate.

The color correcting film may be ink printed on the light guide plate. In a case in which a sheet-like member is disposed along the emission surface of the light guide plate, the color correcting film may be ink printed on the sheet-like member. Further if a sheet-like member is disposed along the back surface of the light guide plate, the color correcting film may be ink printed on the sheet-like member. In the ink forming the color correcting film, response characteristics to the short-wavelength component and long-wavelength component contained in the irradiation light are different from each other.

The color correcting film is preferably composed of a great number of film elements. If the ink is applied, a great number of the ink elements are printed on the light guide plate or other sheet-like member.

Hereinafter, the present invention will be described in detail with reference to the accompanying drawings.

EMBODIMENT (1) First Embodiment

Figure 2:
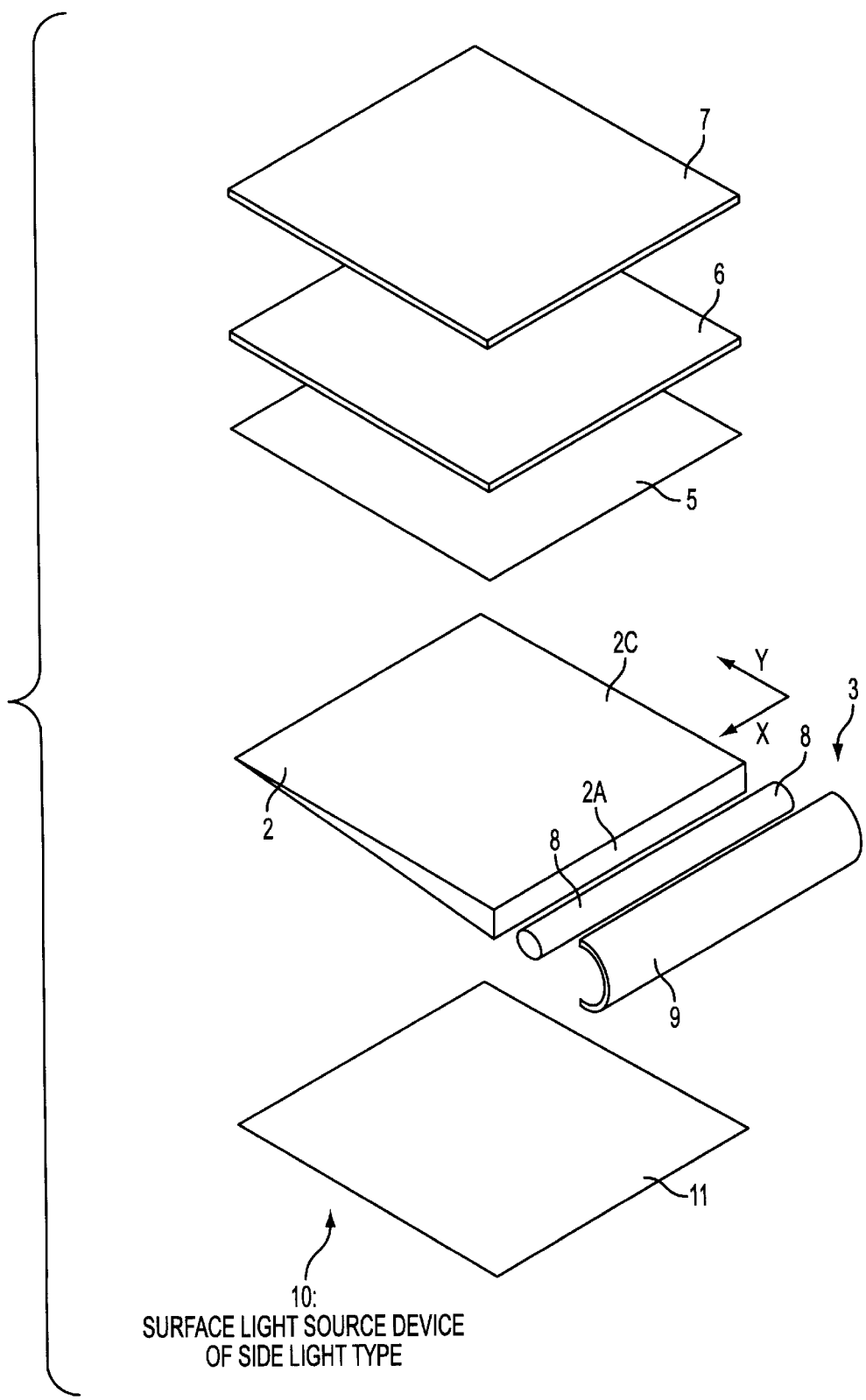
FIG. 2 is a disassembly perspective view showing an entire structure of the surface light source device of side light type employing the reflection sheet of FIG. 1.
Figure 12:
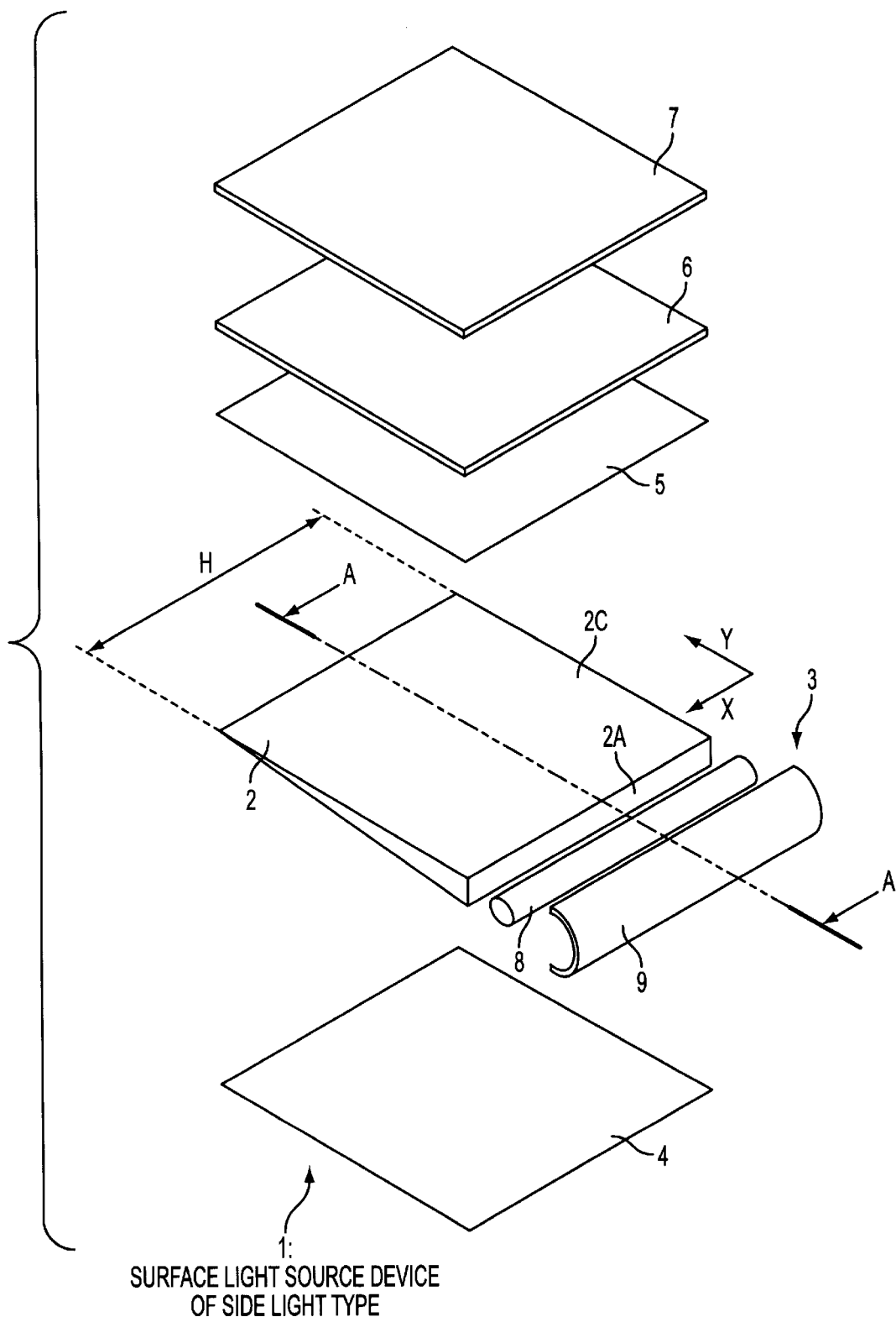
FIG. 12 is a disassembly perspective view showing a conventional surface light source device of side light type.
Figure 13:
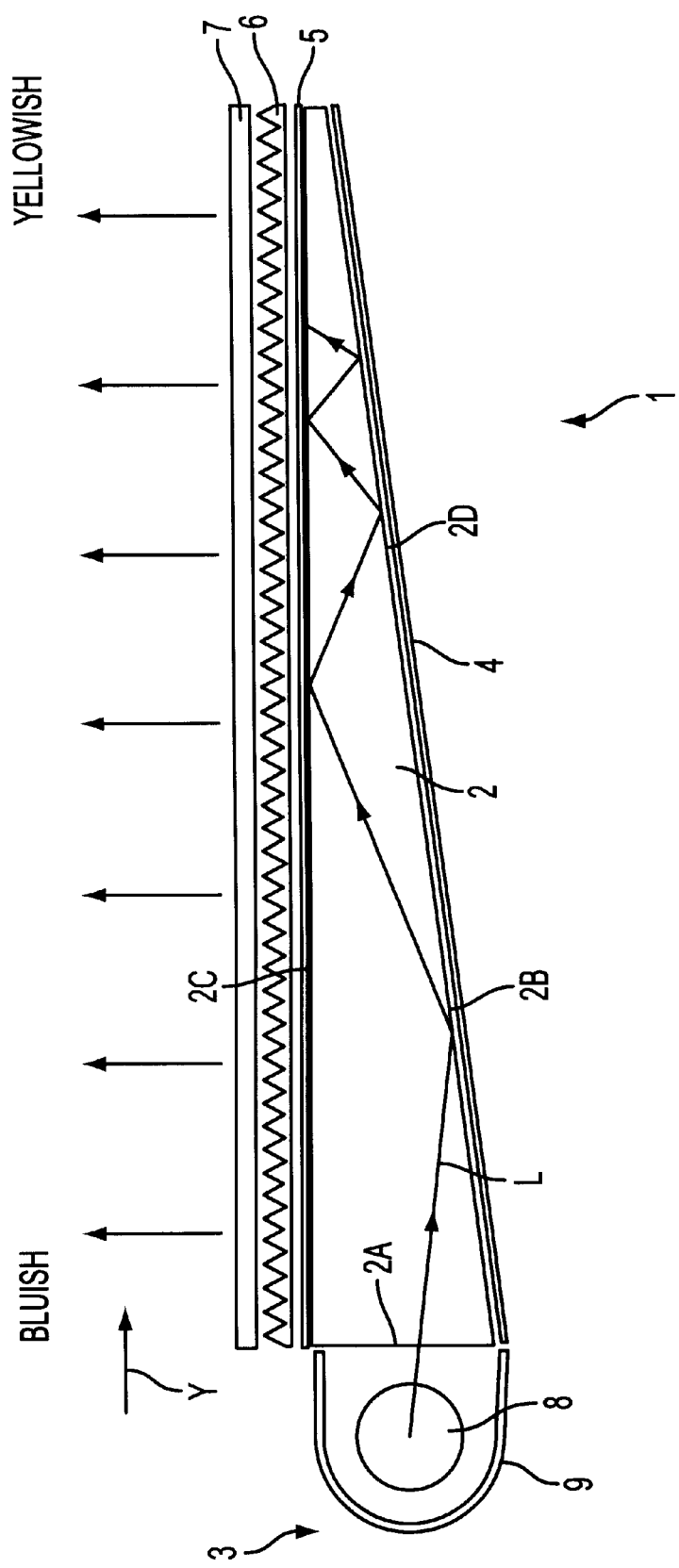
FIG. 13 is a sectional view taken along the line A—A of FIG. 12.

FIG. 2 shows a surface light source device of side light type according to the present embodiment in the same drawing manners as FIG. 12. The surface light source device of side light type 10 shown here has a common structure to FIG. 12 except the reflection sheet 11 is employed instead of the reflection sheet 4. Therefore, common elements are provided with the same reference numerals and duplicated description thereof is simplified.

Referring to FIG. 2, the surface light source device of side light type 10 comprises a light guide plate 2, primary light source 3, reflection sheet 11, light scattering sheet 5, and prism sheets 6, 7 acting as a light control member. The reflection sheet 11, light guide plate 2, light scattering sheet 5, and prism sheets 6, 7 are laminatedly arranged and fixed by a frame member (not shown).

The light guide plate 2 has two major surfaces. One major surface provides an emission surface 2C and another major surface provides a back surface 2B. An end face of the light guide plate 2 provides an incidence surface 2A. The primary light source 3 is composed of a fluorescent lamp 8 with a reflector 9 on the back. The emission light of the fluorescent lamp 8 contains both short-wavelength component (blue light component) and long-wavelength (red light component) of visible ray region.

Figure 14:
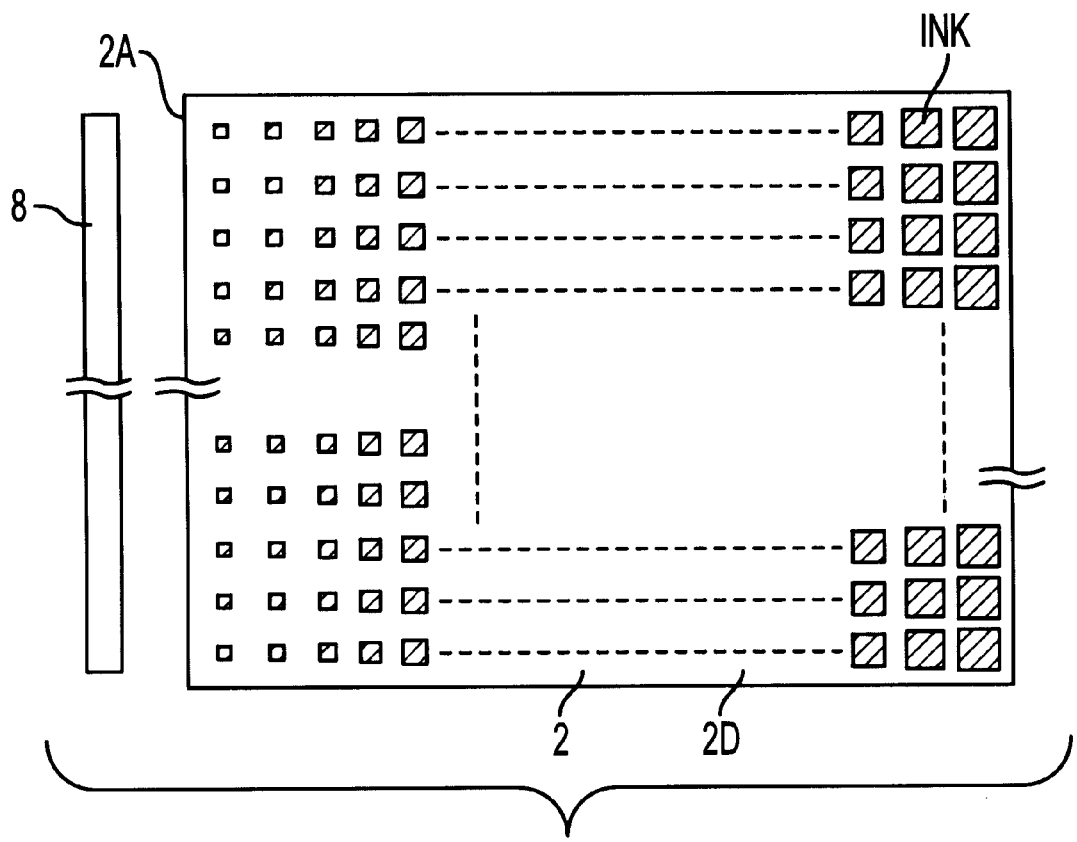
FIG. 14 is a plan view showing a back surface of the light guide plate employed in the surface light source device of side light type shown in FIG. 12.

To intensify brightness level and uniformity of the surface light source device, the back surface 2B of the light guide plate 2 provides a light scattering surface. The light scattering surface contains a distribution pattern composed of, for example, a great number of light scattering dot-like elements like the light scattering surface 2D of FIG. 14. The prism sheets 6, 7 provided as a light control member correct main transmission direction of the irradiation light to the frontal direction of the emission surface 2C.

Figure 1:
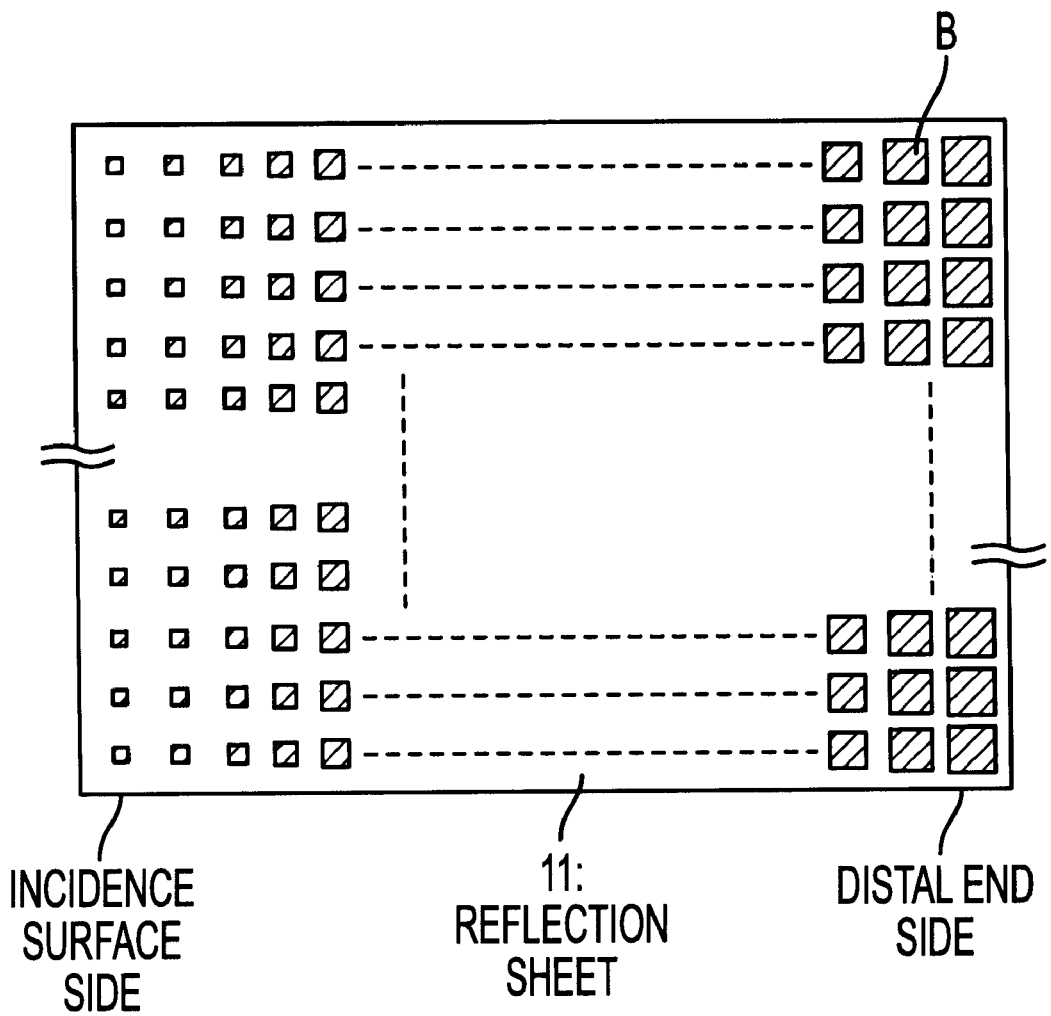
FIG. 1 is a plan view of a reflection sheet employed in a surface light source device of side light type according to a first embodiment.

According to the present embodiment, the feature of the present invention is embodied in the reflection sheet 11. FIG. 1 shows a reflection surface of the reflection sheet 11, opposing the back surface of the light guide plate 2. The reflection sheet 11 contains white PET film and a great number of color correcting film elements B formed thereon. Each of the distributed correcting film elements B is composed of an ink printing layer in which response characteristic to short-wavelength in the visible ray region and that to long-wavelength are different from each other.

According to this example, the elements B are arranged regularly at a constant pitch. Then, the size of the elements B increases along a direction from the neighborhood of the incidence surface toward an end.

The ink B may be blue ink or blue tinted white ink. As well known, a complementary color for blue is yellow. Thus, in the reflection sheet 11, its absorption capacity for yellow wavelength region increases as it approaches the end of the wedge. In other words, the absorption capacity for yellow wavelength region decreases as it approaches the incidence surface.

The irradiation light emitted from the fluorescent lamp 8 is introduced into the inside of the light guide plate 2 through the incidence surface 2A directly or after reflected by a reflector 9. This irradiation light is transmitted inside of the light guide plate 2 while repeatedly reflected between the back surface and emission surface. This irradiation light is subjected to scattering by the back surface.

In this while, a part of the irradiation light leaks from the back surface of the light guide plate 2 and reflected by the reflection surface of the reflection sheet 11 to be brought back into the inside of the light guide plate 2. What is important here is that the irradiation light impinging upon the ink elements B is corrected in terms of color so that its yellow component is absorbed. Because occupation rate of the ink element B increases as it approaches the end, this color correcting operation is intensified as it approaches the end. As a result, the irradiation light emitted from the emission surface 2C is corrected so that the yellow component is more suppressed as it approaches the end from the incidence surface of the light guide plate.

In this embodiment, the uniformity of the color of the irradiation light is improved based on such action.

(2) Second Embodiment

Figure 3A:
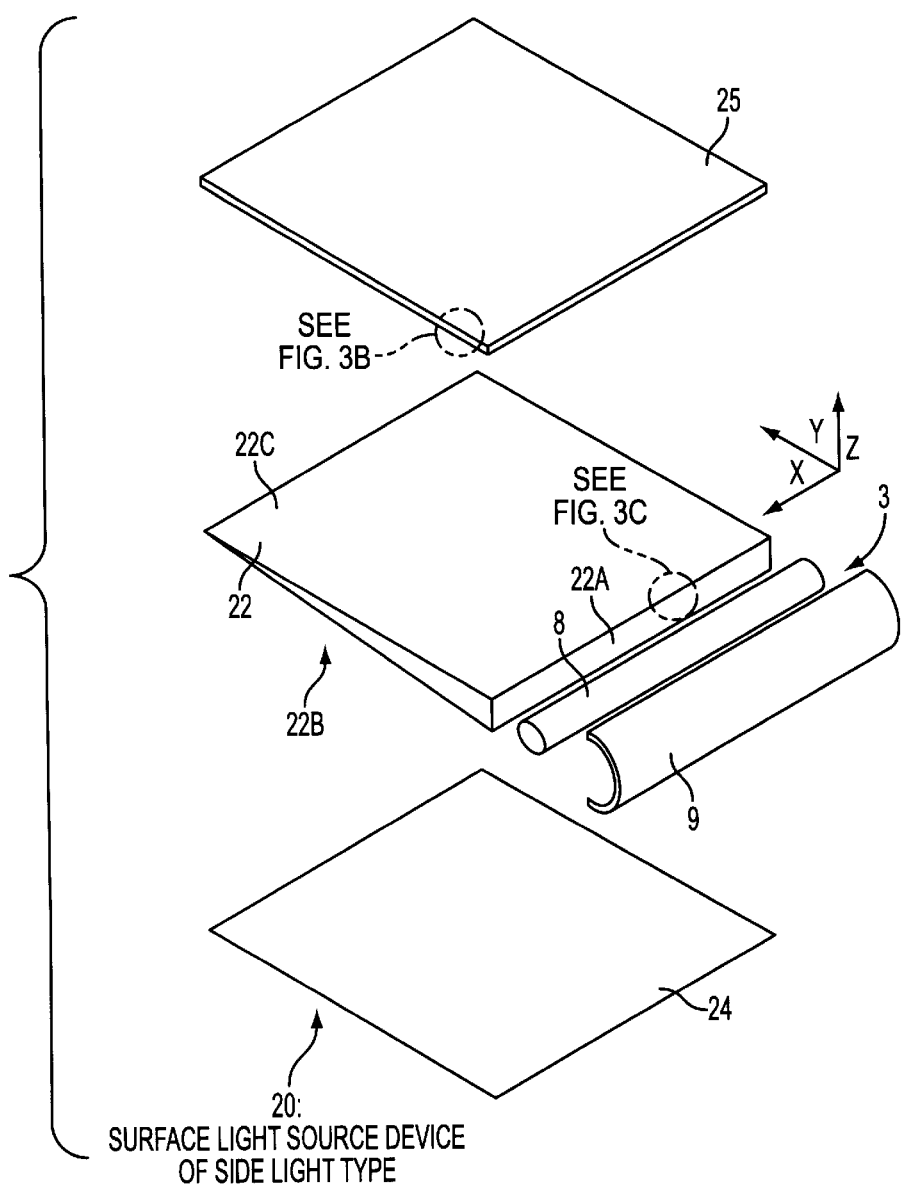
FIGS. 3A to 3C are a disassembly perspective views showing a surface light source device of side light type according to a second embodiment.

FIG. 3A shows a surface light source device of side light type according to the present embodiment in the same drawing manners as FIG. 2. Referring to FIG. 3A, the surface light source device of side light type 20 comprises a light guide plate 22, primary light source 3, reflection sheet 24, and prism sheet 25 acting as a light control member. The reflection sheet 24, light guide plate 22 and prism sheet 25 are laminatedly arranged and fixed by a frame member (not shown).

The light guide plate 22 is composed of, for example, transparent acrylic resin and has two major surfaces. One major surface provides an emission surface 22C and another major surface provides a back surface 22B. An end face of the light guide plate 22 provides an incidence surface 22A. The primary light source 3 is composed of a fluorescent lamp 8 with a reflector 9 on the back. The emission light from the fluorescent lamp 8 contains both short-wavelength component (blue light component) and long-wavelength component (red light component) of visible ray region.

To intensify brightness level of the surface light source device and uniformity thereof, the back surface 22B of the light guide plate 22 provides a light scattering surface. The light scattering surface contains a distribution pattern composed of, for example, a great number of light scattering dot-like elements. As shown by partial enlargement by an arrow B, a prism surface is formed on the emission surface 22C.

Figure 3B:
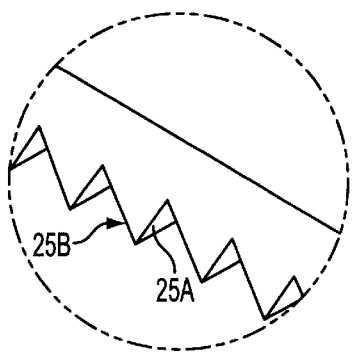
Figure 3C:
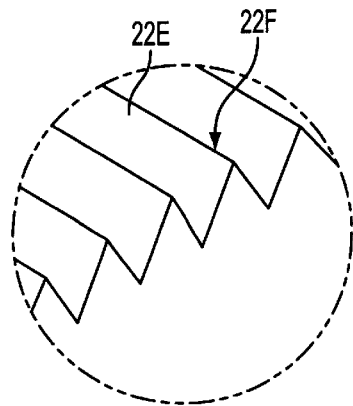

This prism surface contains a great number of projections having a pair of slopes 22E, 22F, as illustrated in FIG. 3C. These projections extend substantially perpendicular to the incidence surface 22A so as to emit the irradiation light gathered in the frontal direction, in a plane parallel to the incidence surface 22A.

The prism sheet 25 has directivity correcting function for correcting directivity in a plane perpendicular to the incidence surface 22A. The prism sheet 25 is formed of transmissive sheet-like material such as polycarbonate and as shown by enlarged extraction by an arrow C, a prism surface is formed on a side opposing the light guide plate 22.

This prism surface is provided with a great number of projections having a pair of slopes 25A, 25B, as illustrated in FIG. 3B. These projections extend substantially parallel to the incidence surface 22A. The prism sheet 25 corrects directivity of the irradiation light in a plane perpendicular to the incidence surface 22A and then emits the light. As a result, the prism surface of the emission surface 22C and the prism sheet 25 correct the directivity two-dimensionally so as to provide the irradiation light substantially in the frontal direction.

In the reflection sheet 24, like the reflection sheet 11 employed in the first embodiment, the color correcting film is formed on the white PET film by printing. Cyan ink is used for this ink. The cyan ink absorbs the red irradiation light. This absorption power increases as it approaches the end from the incidence surface 22A.

Figure 4:
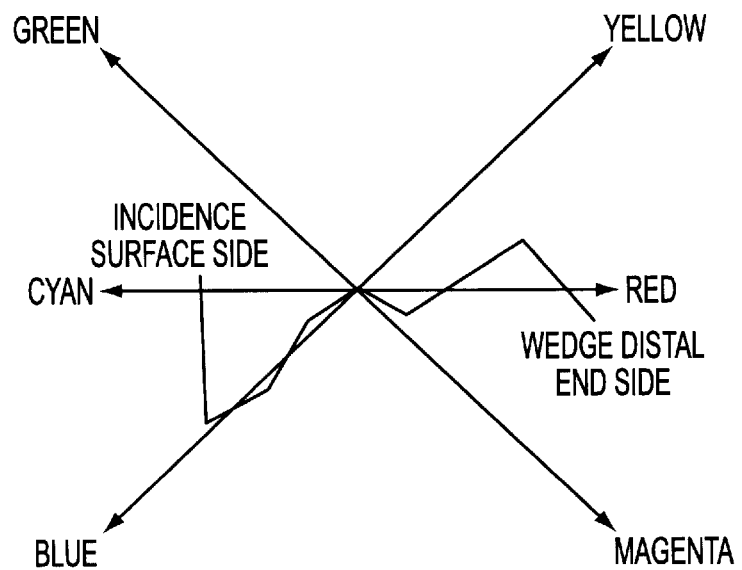
FIG. 4 is a reference graph for explaining operation of the reflection sheet employed in the surface light source device of side light type shown in FIG. 3.

To understand the operation of the reflection sheet 24 and an optimum design of the cyan absorption power distribution, see a reference graph of FIG. 4. FIG. 4 schematically shows a result of measurement of color of the emission light when the reflection sheet having no color correcting film is employed without changing other condition of the present embodiment, in terms of chromaticity distribution. As shown in FIG. 4, the color of the emission light near the incidence surface is nearer cyan as compared with a central area of the emission surface. Further, the color of the emission light is near red in the vicinity of the wedge distal end.

The distribution of the cyan color absorption power is preferred to be designed so that the chromaticity distribution is compensated (made even). The distribution of the cyan color absorption power can be adjusted by, for example, distribution of size and density or other factors of printing ink element.

According to the present embodiment, by the reflection sheet 24 provided so that the cyan color absorption power decreases as it approaches the end from the incidence surface 22A, the uniformity of the color of the irradiation light is improved like the first embodiment.

(3) Third Embodiment

Figure 5A:
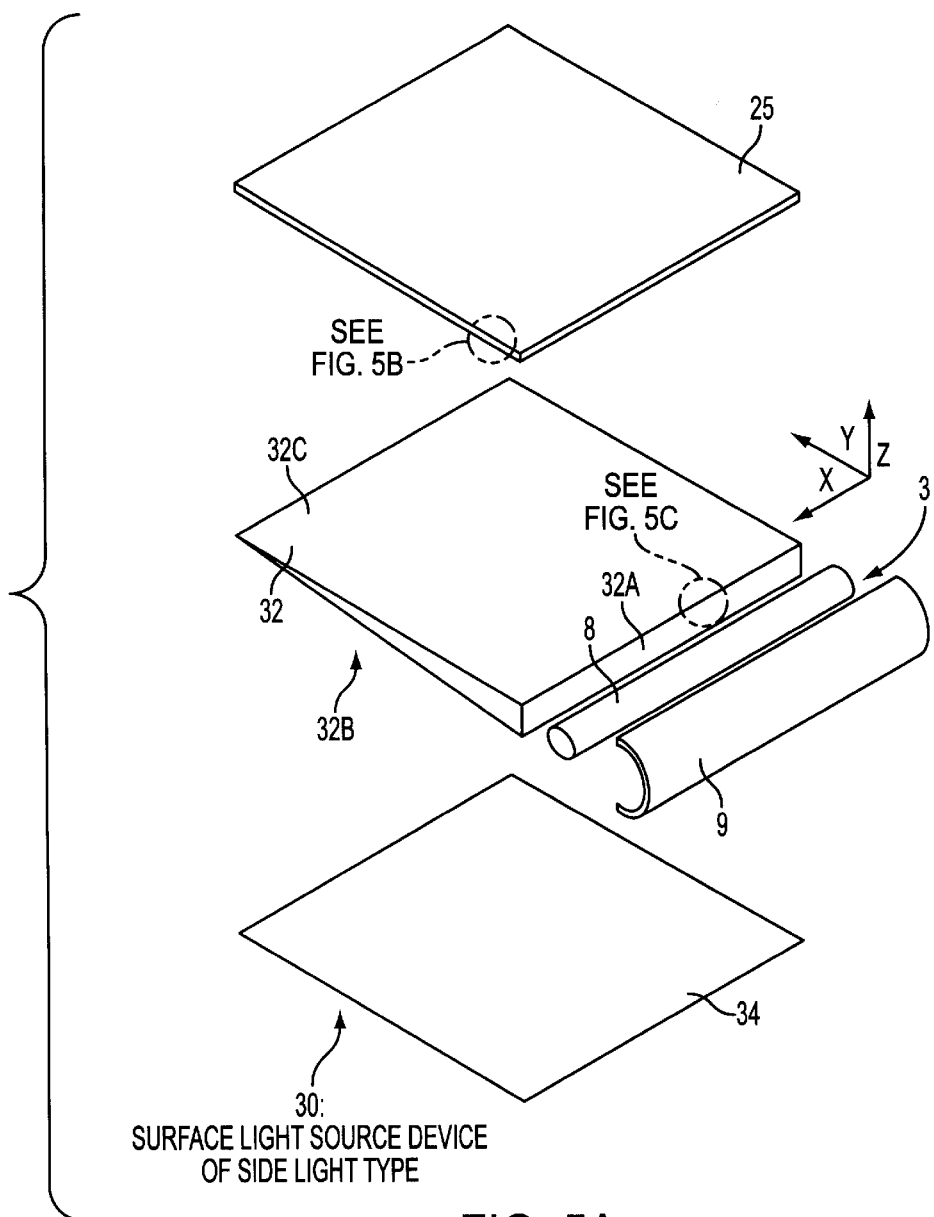
FIGS. 5A to 5C are disassembly perspective views showing a surface light source device of side light type according to a third embodiment.

FIG. 5A shows a surface light source device of side light type in the same drawing manners as FIGS. 2, 3A. Referring to FIG. 3A, the surface light source device of side light type 30 comprises a light guide plate 32, primary light source 3, reflection sheet 34 and prism sheet 25 acting as a light control member. The reflection sheet 34, light guide plate 32 and prism sheet 25 are laminatedly arranged and fixed by a frame member (not shown).

The light guide plate 32 is formed of, for example, transparent acrylic resin and has two major surfaces. One major surface provides an emission surface 32C and another major surface provides a back surface 32B. An end face of the light guide plate 32 provides an incidence surface 32A. The primary light source 3 is formed of a fluorescent lamp 8 with a reflector 9 on the back. The emission light of the fluorescent lamp 8 contains both short-wavelength component (blue light component) and long-wavelength component (red light component) of visible ray region.

To intensify brightness level and uniformity of the surface light source device, a back surface 32B of the light guide plate 32 provides a light scattering surface. The light scattering surface contains a distribution pattern composed of a great number of, for example, light scattering dot-like elements. As shown by enlarged extraction by an arrow D, a prism surface is formed on the back surface 32B.

Figure 5B:
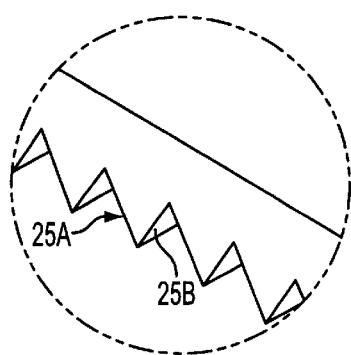
Figure 5C:
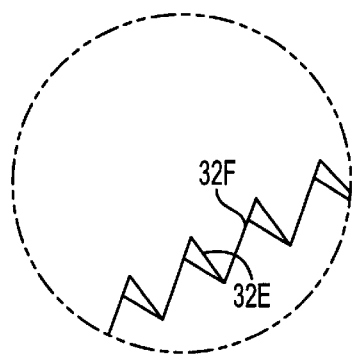

This prism surface has a great number of projections having a pair of slopes 32E, 32F, as illustrated in FIG 5C. These projections extend substantially perpendicular to the incidence surface 32A so that the irradiation light is gathered to the frontal direction, in a plane parallel to the incidence surface 32A and directed to the emission surface 32C. As a result, the irradiation light to the frontal direction increases in a plane parallel thereto.

The prism sheet 25 has directivity correcting function for correcting directivity in a plane perpendicular to the incidence surface 32A. The prism sheet 25 is formed of a transmissive sheet-like material such as polycarbonate or the like. As shown by enlarged extraction by a reference numeral C, a prism surface is formed on a side opposing the light guide plate 32.

This prism surface is provided with a great number of projections having a pair of slopes 25A, 25B, as illustrated in FIG. 5B. These projections extend substantially parallel to the incidence surface 32A. The prism sheet 25 corrects directivity of the irradiation light in a plane perpendicular to the incidence surface 32A and emit the corrected light. As a result, the prism surface on the back surface 32B and prism sheet 25 correct the directivity two-dimensionally and provide the irradiation light substantially in the frontal direction.

In the reflection sheet 34, like the reflection sheet 11 employed in the second embodiment, a color correcting film is formed on the white PET film by printing. Cyan ink is used for this ink.

The cyan ink is printed according to a pattern shown in FIG. 1. The cyan ink absorbs red irradiation light. This absorption power increases as it approaches an end from the incidence surface 32A.

The color of the emission light when a reflection sheet having no color correcting film is employed is expressed in terms of chromaticity distribution like in FIG. 4. That is, the color of the emission light is nearer cyan color as compared with a central area of the emission surface. The color of the emission light is near red in the vicinity of the wedge distal end. The distribution of the cyan color absorption power of the reflection sheet 34 is preferred to be designed so that the color distribution is compensated (made even). The cyan color absorption power distribution can be adjusted by, for example, distribution of size and density or other factors of printing ink element.

According to the present embodiment, by the reflection sheet 34 provided so that the cyan color absorption power decreases as it approaches the end from the incidence surface 32A, the uniformity of the color of the irradiation light is improved like the second embodiment.

(4) Fourth Embodiment

Figure 6A:
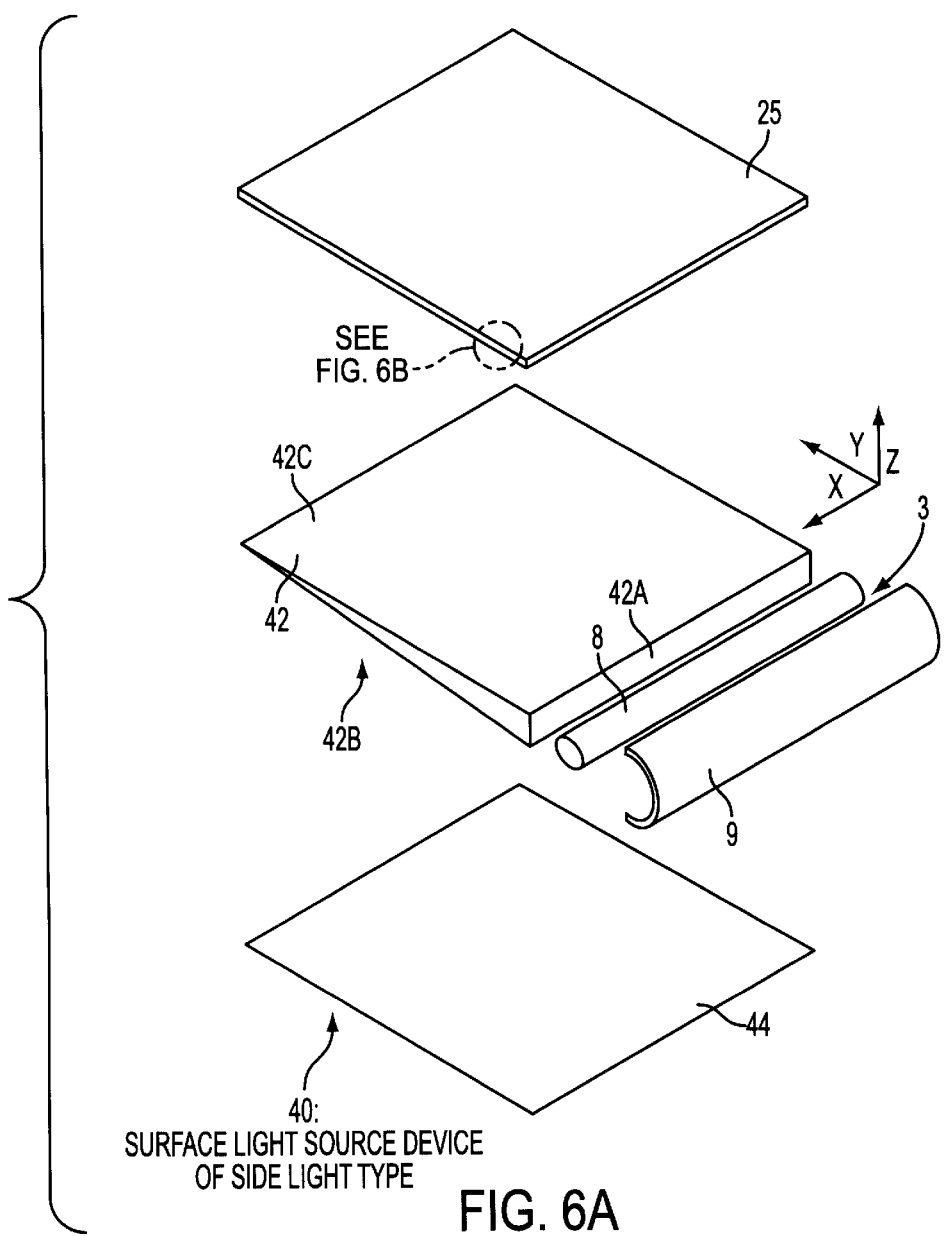
FIGS. 6A and 6B are disassembly perspective views showing a surface light source device of side light type according to a fourth embodiment.

FIG. 6A shows a surface light source device of side light type according to the present embodiment in the same drawing manners as FIG. 3A. Referring to FIG. 6A, the surface light source device of side light type 40 comprises a light guide plate 42, primary light source 3, reflection sheet 44, and prism sheet 25 acting as a light control member. The reflection sheet 44, light guide plate 42 and prism sheet 25 are laminatedly arrangement and fixed by frame member (not shown).

The light guide plate 42 is formed of, for example, transparent acrylic resin and has two major surfaces. One major surface provides an emission surface 42C and another major surface provides a back surface 42B. An end face of the light guide plate 42 provides an incidence surface 42A. The primary light source 3 is formed of a fluorescent lamp 8 with a reflector 9 on the back. The emission light of the fluorescent lamp 8 contains both short-wavelength component (blue light component) and long-wavelength (red light component) of visible ray region.

To intensify brightness level and uniformity of the surface light source device, the entire emission surface 42C of the light guide plate 42 is treated with rough-surface processing. On the other hand, the entire back surface 42 is a mirror surface.

The prism sheet 25 has directivity correcting function for correcting the directivity in a plane perpendicular to the incidence surface 22A. The prism sheet 25 is formed of a transmissive sheet-like material such as polycarbonate or the like. As shown by enlarged extraction by an arrow C, a prism surface is formed on a side opposing the light guide plate 22.

Figure 6B:
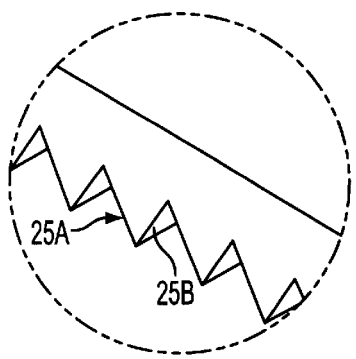

This prism surface has a great number of projections having a pair of slopes 25A, 25B, as illustrated in FIG 6B. These projections extend substantially parallel to the incidence surface 22A. The prism sheet 25 corrects the directivity of the irradiation light in a plane perpendicular to the incidence surface 22A and emits the corrected light.

In the reflection sheet 24, like the reflection sheet 11 employed in the first embodiment, color correcting film is formed on the white PET film by printing. Green ink is employed for the ink.

The green ink is printed according to a pattern shown in FIG. 1, for example. The green ink absorbs irradiation light of magenta color. This absorption power increases as it approaches an end from the incidence surface 32A.

Figure 7:
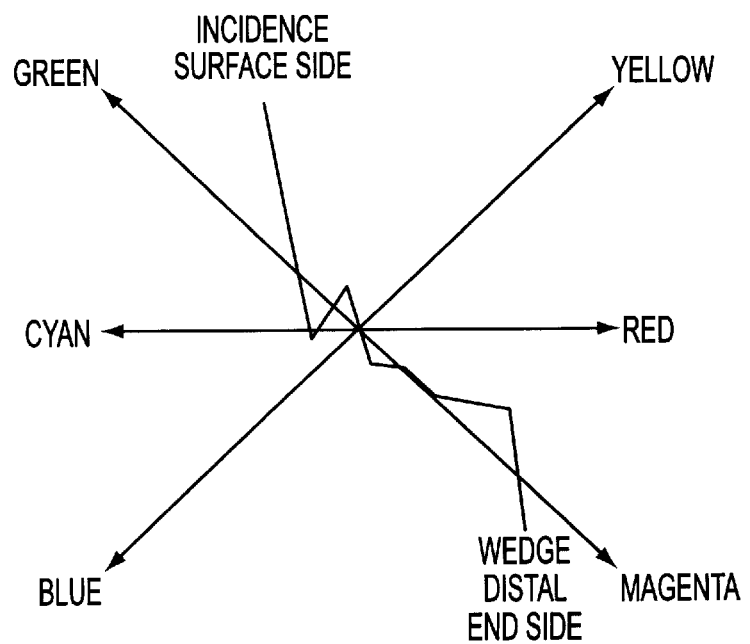
FIG. 7 is a graph for explaining the response characteristic of the reflection sheet employed in the surface light source device of side light type shown in FIG. 6.

To understand an optimum design of the operation of the reflection sheet 44 and magenta absorption power distribution, see a reference graph of FIG. 7. FIG. 7 schematically shows a result of measurement of the color of the emission light when the reflection sheet having no color correcting film is employed without changing other condition of the present embodiment, in terms of chromaticity distribution.

As shown in FIG. 7, the color of the emission light near the incidence surface is nearer green as compared with a central area of the emission surface. Further, the color of the emission light is nearer magenta color in the vicinity of the wedge distal end.

The distribution of magenta absorption power is preferred to be designed so that such chromaticity distribution is compensated (made even). The distribution of the magenta absorption power can be adjusted by, for example, distribution of the size and density or other factors of printing ink element.

According to the present embodiment, by the reflection sheet 44 provided so that the magenta absorption power decreases as it approaches the incidence surface 22A, the uniformity of the color of the irradiation light is improved like the first-third embodiments.

(5) Other Embodiments

The above described embodiment does not restrict the present invention, for example, modifications as described below can be said.

Figure 8:
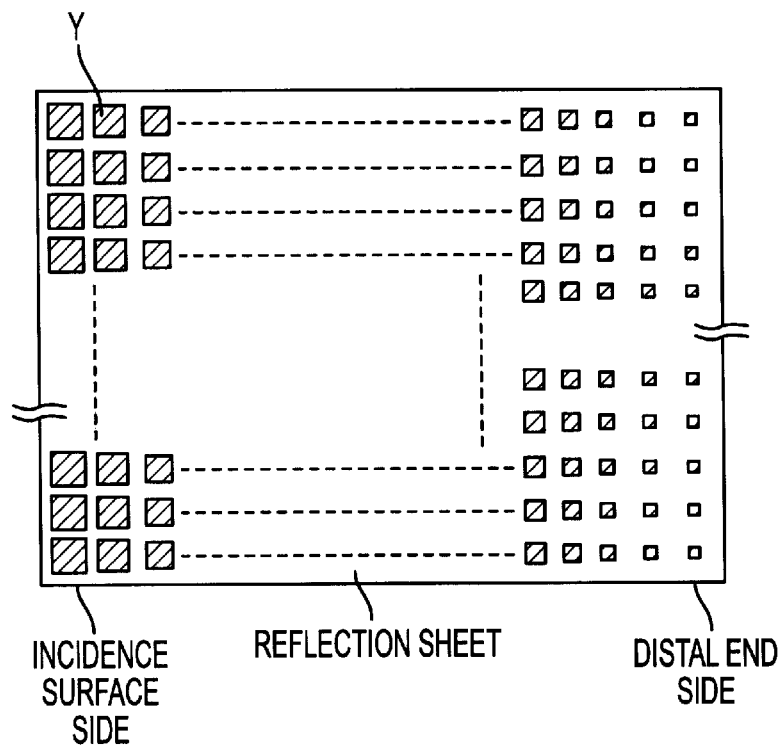
FIG. 8 is a plan view showing a reflection sheet according to another embodiment.

(a) Conversely with the first embodiment, it is permissible to form the color correcting film by printing yellow or yellowish white ink Y as shown in FIG. 8 so that the short-wavelength component of the irradiation light is reflected as it leaves the incidence surface. In this case, ink is printed so that ink coating area per unit area decreases as it leaves the incidence surface.

In other words, because yellow or yellowish white ink Y is printed in high density near the incidence surface, blue light is absorbed excellently so as to suppress excessive blue component. Further, because yellow or yellowish white ink Y is printed in low density near the end portion, the blue light is not absorbed to suppress shortage of blue element so that yellow component becomes difficult to emerge.

Further in another viewpoint, near the incidence surface, the degree of reflecting the long-wavelength component (yellow component) of the irradiation light is high and this reflection is scattering reflection. Therefore, this reflected long-wavelength component is abundant of components having smaller angles than the critical angle relative to the emission surface.

Therefore, near the incidence surface, the emission of the long-wavelength component from the emission surface is accelerated.

As a result, the short-wavelength component (blue) decreased due to absorption of the ink Y is partly supplemented by increasing the long-wavelength component (yellow), so that the entire emission light amount can be increased as compared with the first embodiment. Thus, if it is desired to emit the irradiation light without any waste, it is favorable to use such methods.

(b) These relations can be applied also to the second to fourth embodiments. That is, by printing the ink of a complementary color to the aforementioned color as shown in FIG. 8 instead of that aforementioned ink, the same effect can be attained.

Figure 9:
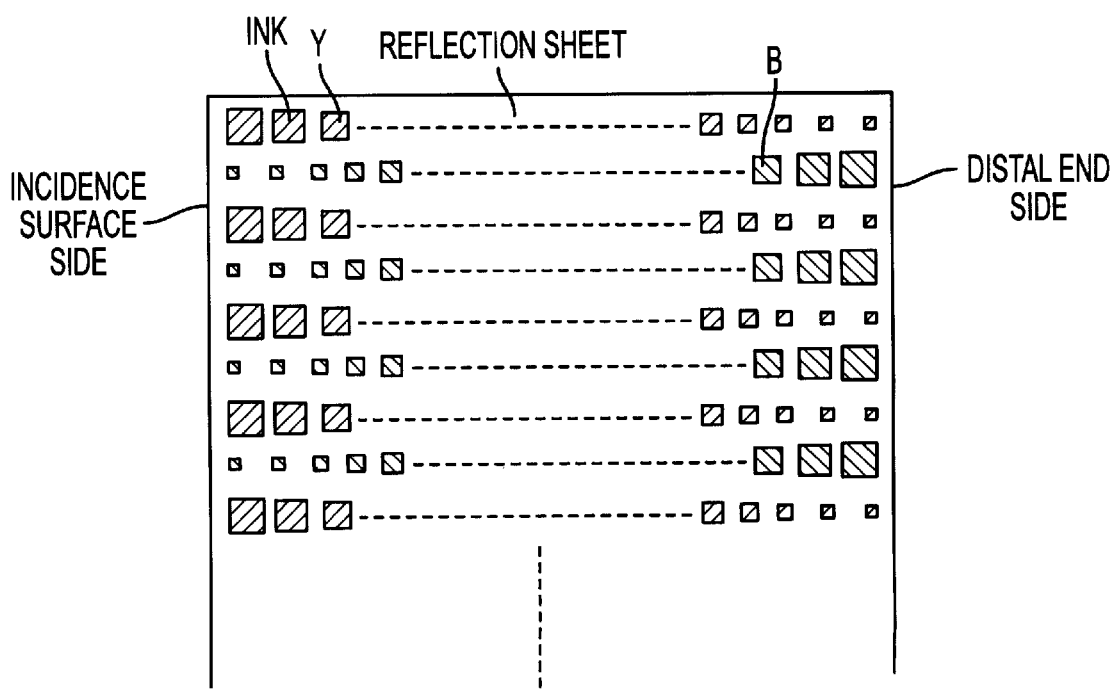
FIG. 9 is a plan view showing a reflection sheet on which two kinds of inks are printed.

(c) Further, by printing both blue ink or bluish white ink B and yellow or yellowish white ink Y as shown in FIG. 9, in the first embodiment, it is permissible to form the color correcting film.

Further, depending on the change of color, it is permissible to mix two or three or more color inks at a ratio. For example, it is possible to mix red and yellow, or blue and green.

(d) Depending on a change of color distribution, it is permissible to repeatedly print two or three or more color inks. In this case, it is permissible to print, for example, yellow ink in a region from the incidence surface up to a predetermined distance and then red ink in a subsequent region.

(e) In the first-fourth embodiments, ink is printed in the square shape at a predetermined pitch to form the color correcting film. However, the present invention is not restricted to this example.

Figure 10:
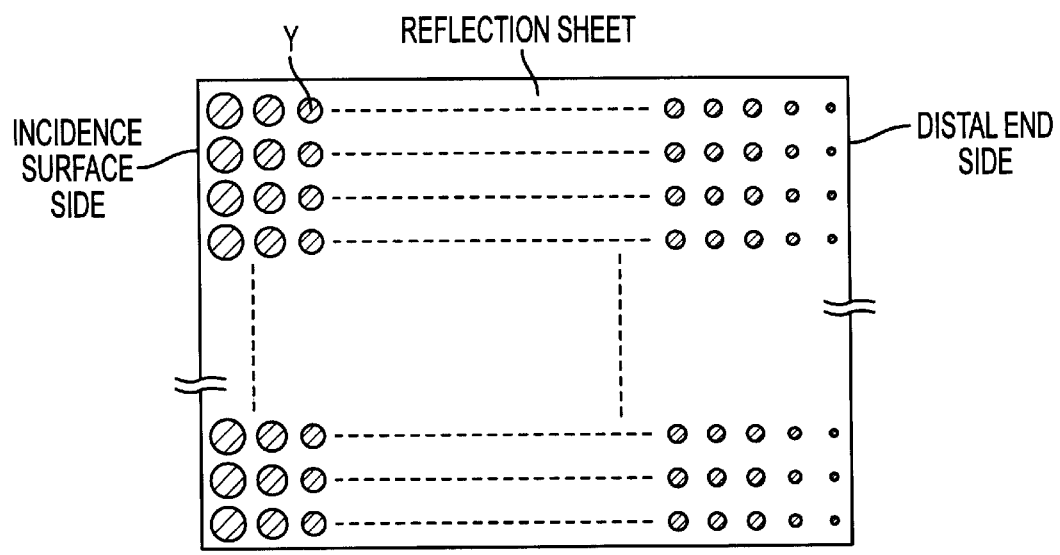
FIG. 10 is a plan view showing a reflection sheet on which color correcting film is formed by printing circular ink elements.

For example, as shown in FIG. 10, it is permissible to form a color correcting film composed of circular shaped ink printing elements. Further, it is permissible to dispose the ink printing elements at random.

Figure 11:
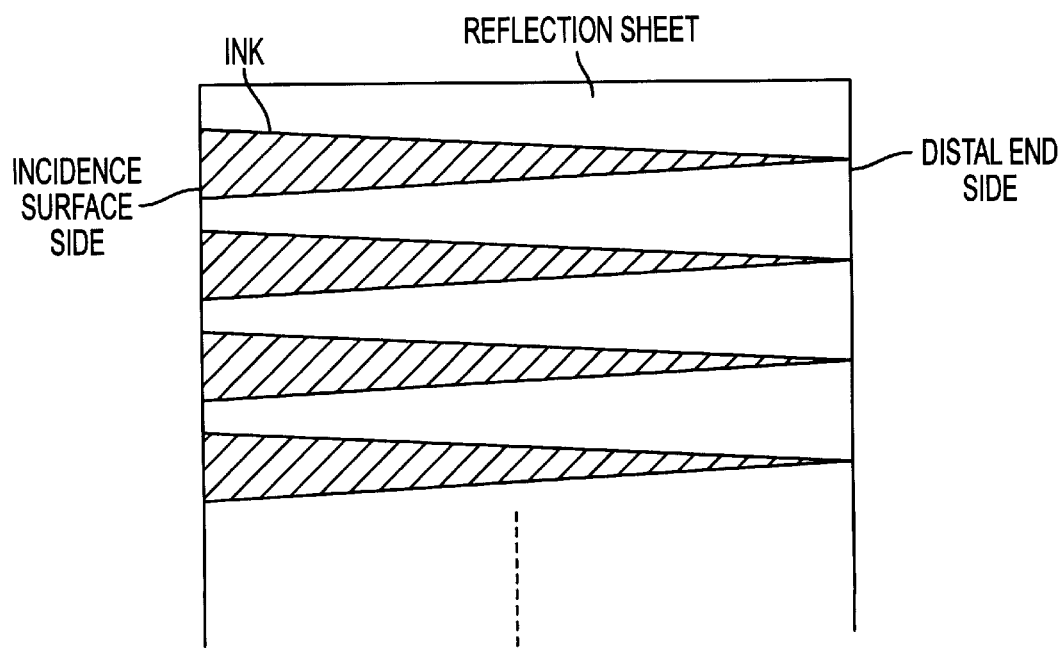
FIG. 11 is a plan view showing a reflection sheet on which color correcting film is formed by printing belt-like ink elements.

Further, as shown in FIG. 11, it is permissible to form the color correcting film by belt-like print whose width changes as it approaches the wedge distal end from the incidence surface.

(f) In the first to fourth embodiments, the light response characteristic (absorption power or light reflection absorption power) of the color correcting film is provided with a smooth change. However, the present invention is not restricted to this example.

For example, as long as it is practically permitted, it is permissible to form the color correcting film so that the light response characteristic changes stepwise.

(g) The color correcting film may be formed by printing ink on the back surface of the light guide plate or emission surface thereof. Instead, it is permissible to form the color correcting film on the light scattering sheet or other elements.

If the light scattering surface of the light guide plate is formed by printing an ink, it may serve as both the light scattering surface and color correcting film by using an ink of a predetermined color as this ink.

(h) The color correcting film may be formed by printing a fluorescent ink.

(i) The color correcting film may be formed by other methods than ink printing method. For example, it is permissible to dispose various sheet-like members along the emission surface and back surface of the light guide plate to form the light distribution correcting film by these sheet-like members. In this case, it is possible to use a sheet-like member whose color changes gradually from the incidence surface side.

If the color correcting film whose light response characteristic stepwise changes is formed, it is permissible to dispose a sheet-like member of a predetermined color near the incidence surface or partly in a predetermined region of the end portion to form the color correcting film.

(j) In the above embodiments, the case of forming the light scattering surface by printing on the back surface has been described. However, the present invention is not restricted to this example. For example, it is permissible to make partially the back surface rough-treated to form the light scattering surface.

(k) The light scattering surface may be formed on both the emission surface of the light guide plate and back surface. Further, it is permissible to form the light scattering surface on the reflection sheet.

(l) The reflector of the primary light source and the reflection sheet disposed along the back surface of the light guide plate may be a regular reflection member like a sheet-like material, for example, on which silver is evaporated.

(m) A double-sided prism sheet may be used as a prism sheet.

(n) In the aforementioned embodiments, the end face receiving supply of light from the primary light source is one. However, the present invention is not restricted to this example. The present invention can be applied to a surface light source device of side light type in which the irradiation light impinges from two or more end faces. In this case, the central portion of the light guide plate corresponds to the "wedge distal end" in the aforementioned embodiments.

(o) In the aforementioned embodiments, the light guide plate having a wedge-shaped section is used. However, the present invention is not restricted to this example. For example, this present invention may be applied to a surface light source device of side light type having a substantially equal thickness.

(p) In the aforementioned embodiments, the primary light source having the fluorescent lamp is used. However, the present invention is not restricted to this example. For example, it is permissible to form the primary light source by disposing a plurality of point light sources such as light emission diode or the like.

(q) The surface light source device of the present invention may be applied to other applications than back-lighting of the liquid crystal display device. For example, this device may be widely applied to various lighting appliances and displays.

What is claimed is:

1. A surface light source device of side light type comprising:

a light guide plate having two major surfaces providing an emission surface and a back surface;

a primary light source to supply irradiation light containing short-wavelength component and long-wavelength component of visible ray region through a side end face of said light guide plate; and a color correcting film disposed in the vicinity of at least one of said major surfaces to prevent output light of said emission surface from changing in color depending on distance from said side end face.

2. A surface light source device of side light type according to claim 1 wherein said color correcting film is formed of ink printed on said light guide plate, said ink being printed so as to prevent output of said emission surface from changing in color depending on distance from said side end face.

3. A surface light source device of side light type according to claim 1 wherein a sheet-like member is disposed along said emission surface and said color correcting film is formed of ink printed on said sheet-like member, said ink being printed so as to prevent output of said emission surface from changing in color depending on distance from said side end face.

4. A surface light source device of side light type according to claim 1 wherein a sheet-like member is disposed along said back surface and said color correcting film is formed of ink printed on said sheet-like member, said ink being printed so as to prevent output of said emission surface from changing in color depending on distance from said side end face.

5. A surface light source device of side light type according to claim 1 further comprising a light control member to supply directivity of output light of said emission surface of said light guide plate.

6. A surface light source device of side light type comprising:

a light guide plate having two major surfaces providing an emission surface and a back surface;

a primary light source to supply irradiation light containing short-wavelength component and long-wavelength component of visible ray region through a side end face of said light guide plate; and a color correcting film disposed in the vicinity of at least one of said major surfaces preventing output light of said emission surface from changing in color depending on distance from said side end face, said color correcting film being composed of a plurality of film elements.

7. A surface light source device of side light type according to claim 6 wherein said color correcting film elements are formed of ink elements printed on said light guide plate, said ink elements being printed so as to prevent output of said emission surface form changing in color depending on distance from said side end face.

8. A surface light source device of side light type according to claim 6 wherein a sheet-like member is disposed along said emission surface and said color correcting film elements are formed of ink elements printed on said sheet-like member, said ink elements being printed so as to prevent output of said emission surface from changing in color depending on distance from said side end face.

9. A surface light source device of side light type according to claim 6 wherein a sheet-like member is disposed along said back surface and said color correcting film elements are formed of ink elements printed on said sheet-like member, said ink elements being printed so as to prevent output of said emission surface from changing in color depending on distance from said side end face.

* * * * *